(12) United States Patent
Krishnaswamy et al.

(10) Patent No.: US 7,573,820 B2
(45) Date of Patent: Aug. 11, 2009

(54) TECHNIQUES TO CONTROL DATA TRANSMISSION FOR A WIRELESS SYSTEM

(75) Inventors: Dilip Krishnaswamy, Roseville, CA (US); Curtis Jutzi, Lake Oswego, OR (US); Eugene P. Matter, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 11/171,589

(22) Filed: Jun. 29, 2005

(65) Prior Publication Data

US 2007/0002742 A1    Jan. 4, 2007

(51) Int. Cl.
*G01R 31/08* (2006.01)
*G06F 11/00* (2006.01)
*H04J 1/16* (2006.01)
*H04L 1/00* (2006.01)

(52) U.S. Cl. .................. 370/235; 370/360; 370/242; 370/395.52; 370/230; 370/349; 455/423; 455/428; 455/63.3; 455/9; 455/199.1

(58) Field of Classification Search .......... 370/349, 370/231, 235, 253, 252, 310, 332, 395.1, 370/395.52, 360, 318, 229, 230, 395.2; 455/512, 455/513, 509
See application file for complete search history.

(56) References Cited

U.S. PATENT DOCUMENTS

| | | | |
|---|---|---|---|
| 5,515,418 A * | 5/1996 | Yamaguchi et al. | 379/32.04 |
| 6,829,215 B2 * | 12/2004 | Tornar | 370/223 |
| 7,245,582 B1 * | 7/2007 | Roberts et al. | 370/217 |
| 2003/0118107 A1 * | 6/2003 | Itakura et al. | 375/240.19 |
| 2003/0126238 A1 * | 7/2003 | Kohno et al. | 709/220 |
| 2003/0189920 A1 * | 10/2003 | Erami et al. | 370/351 |
| 2004/0214602 A1 * | 10/2004 | Aoyama | 455/561 |
| 2005/0013303 A1 * | 1/2005 | Gopalakrishnan et al. | 370/395.21 |
| 2005/0058068 A1 * | 3/2005 | Ben Ali et al. | 370/230 |
| 2005/0268324 A1 * | 12/2005 | An | 725/152 |
| 2006/0120365 A1 * | 6/2006 | Nishihara | 370/389 |
| 2006/0198301 A1 * | 9/2006 | Airy et al. | 370/229 |
| 2006/0251086 A1 * | 11/2006 | Ha et al. | 370/401 |

* cited by examiner

*Primary Examiner*—Huy Q Phan
(74) *Attorney, Agent, or Firm*—Kacvinsky LLC

(57) ABSTRACT

A system, apparatus, method, and article including a control module to manage transmission of packets in a channel of a wireless network. The control module to receive real-time information about the channel. The control module to adapt transmission of said packets based on the information. Other embodiments are described and claimed.

20 Claims, 4 Drawing Sheets

TECHNIQUES TO CONTROL DATA TRANSMISSION FOR A WIRELESS SYSTEM

BACKGROUND

Various communication systems exist today to allow electronic devices such as computers to communicate and exchange data and other types of information such as voice and multimedia communications (e.g., video, sound, data) over local and distributed networks. Various wireless communication systems, such as Wireless Local Area Networks (WLAN) also allow mobile computers to communicate with each other and other computers connected to Wide Area Networks (WAN) such as Internet. Interactive multimedia communications transferred across wireless communication systems require high bandwidth due to the data rates and payload size. For example, real-time multimedia videoconferencing sessions over a wide-area wireless Internet connection requires high data throughput of large payloads, and therefore, the wireless network requires high bandwidth.

Furthermore, in multimedia streaming data is transferred in a stream of packets that are interpreted as they arrive for "just-in-time" delivery of multimedia information. In such multimedia streaming applications WLANs offer several challenges. In a wireless network channel, dynamic variation in the channel conditions due to noise, interference, and path loss effects impact data throughput and packet loss, and hence affects the overall performance of the network. Dynamic changes in the number of users in the network each with varying data rate requirements also result in varying degrees of contention and collision in the network and may impact the amount of bandwidth available per user or per packet flow.

Data throughput reduction and packet loss due to poor channel or link conditions may require that wireless communication devices connected to wireless communications systems attempt packet retransmissions at the data link layer, i.e., medium access control (MAC) layer in the Open Systems Interconnection (OSI) protocol stack. Wireless communication systems also may allow link adaptation and a choice of different modulation and coding schemes at the data link (MAC) layer or at the physical (PHY) layer that may be used for data transmission over the wireless medium. In a wireless communication system, multimedia applications may include prioritized packets. For example, video packet streams transferred over the wireless communication system include some packets that may be of higher priority than other packets. Transmission of prioritized video packets may cause transmission delays in the wireless network. In addition, any action taken by the network to process a given packet will almost always depend on the transport protocol being used. For example, the wireless network will treat transmission of packets using the Real Time Protocol (RTP) over UDP transport protocol differently from transmissions over TCP, for example. Furthermore, there may be a need to provide information regarding aborted packet further transmission attempts at the MAC/PHY layer to upper layers in the protocol stack. In addition, there may be a need to monitor and develop trends of multiple packet retransmission attempts over the wireless communications system and provide intelligent processing operations in the protocol stack may to address these inter-related functionalities. Accordingly, there is a need for techniques to improve such operations, to improve performance in wireless communication devices, and to increase overall wireless communication system performance.

DETAILED DESCRIPTION

Figure 1:
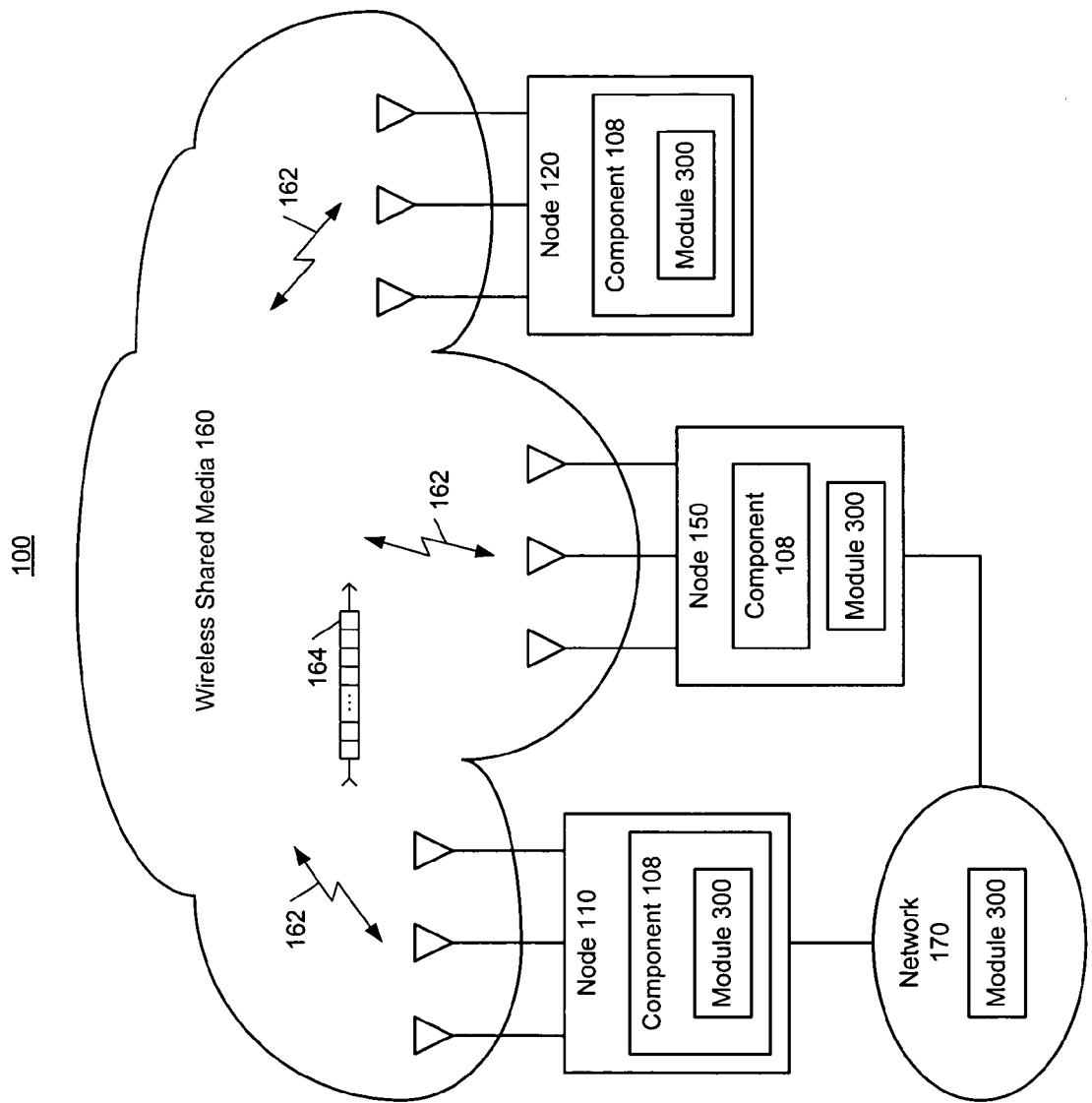
FIG. 1 illustrates one embodiment of a system.

FIG. 1 illustrates one embodiment of a system. FIG. 1 may illustrate a block diagram of a system 100, for example. System 100 may be a distributed system. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a MAC address, and so forth. The embodiments are not limited in this context.

The nodes of system 100 may be arranged to communicate different types of information, such as media information and control information. Media information may refer to any data representing content meant for a user, such as voice information, video information, audio information, text information, numerical information, alphanumeric symbols, graphics, images, and combinations thereof, for example. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with various wireless local area network (WLAN) protocols, such as the IEEE 802.11 series of protocols, including the IEEE 802.11a, 802.11b, 802.11e, 802.11g, 802.11n, and so forth. In another example, system 100 may operate in accordance with various wireless metropolitan area network (WMAN) mobile broadband wireless access (MBWA) protocols, such as a protocol from the IEEE 802.16 or 802.20 series of protocols. In another example, system 100 may operate in accordance with various wireless personal area networks (WPAN), for example include IEEE 802.16e, Blue Tooth, and the like, in which adaptation can be applied using different MCS and MAC retry, packet prioritization, for example.

In various embodiments, for example, system 100 may operate in accordance with one or more wireless protocols, including, for example, cellular protocols in accordance with one or standards. These cellular standards may comprise, for example, Code Division Multiple Access (CDMA), CDMA 2000, Wideband Code-Division Multiple Access (W-CDMA), Enhanced General Packet Radio Service (GPRS), among other standards, for example. The embodiments, however, are not limited in this context.

Referring again to FIG. 1, system 100 may comprise a wireless communication system. In one embodiment, system 100 may comprise a WLAN or WMAN system operating in accordance with the IEEE 802.11, 802.16 or 802.20 series of standard protocols. In one embodiment, for example, system 100 may comprise a WLAN system operating with a number of high throughput (HT) wireless devices arranged to operate in accordance with one or more of the IEEE-802.11n proposed standards. The embodiments are not limited in this context.

In various embodiments, system 100 may comprise a wireless communication system. In one embodiment, system 100 may comprise a Worldwide Interoperability for Microwave Access (WiMax) system operating in accordance with the IEEE 802.16 standard protocols. Those skilled in the art will appreciate that similarities at the MAC/PHY layer between WiMax and WLAN systems operating in accordance with their respective protocols, allow embodiments of system 100 to be adapted to operate as a WiMax system. WiMax may be considered a certification mark for products that pass conformity and interoperability tests for the IEEE 802.16 standards. Those skilled in the art will appreciate that WiMAX is a standards-based wireless technology that provides high-throughput broadband connections over long distances. WiMAX can be used for a number of applications, including "last mile" broadband connections, hotspots, and cellular backhaul, and high-speed enterprise connectivity for business. The embodiments, however, are not limited in this context.

In one embodiment, system 100 may provide cross-layer optimization and manage communications across the layers of the OSI protocol stack. In one embodiment, a common information base may be used to share information between layers of the OSI protocol stack, for example. For example, embodiments of system 100 may provide real-time channel or link adaptation at the MAC layer to adapt to varying channel or link conditions in system 100. The choice of the transport layer such as TCP or UDP also may impact overall network performance. Accordingly, embodiments of system 100 may provide elements or components to adapt to varying conditions in system 100 when processing scalable multimedia applications, for example. Utilization of the physical, data link, transport, and application layer facilities in a selected protocol stack also may provide improved capacity in system 100. Node-level cross-layer optimization techniques may be used to manage end-to-end state and policies across the layers of a particular protocol stack, such as, for example, the OSI protocol stack for transmission of packets over system 100. The embodiments are not limited in this context.

In one embodiment, system 100 may include one or more wireless communication devices, such as nodes 110, 120, 150. Nodes 110, 120, 150 all may be arranged to communicate information signals using one or more wireless transmitters/receivers ("transceivers") or radios, which may involve the use of radio frequency communication via IEEE 802.11 Frequency Hopping Spread Spectrum (FHSS) or Direct Sequence Spread Spectrum (DSSS) schemes, for example. Nodes 110, 120, 150 may communicate using the radios over wireless shared media 160 via multiple inks or channels established therein. For example, the radios may be arranged to operate using the 2.45 Gigahertz (GHz) Industrial, Scientific and Medical (ISM) band of wireless shared media 160. Other operating bands may be used as well. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include nodes 110, 120. Nodes 110, 120 may comprise fixed devices having wireless capabilities. A fixed device may comprise a generalized equipment set providing connectivity, management, and control of another device, such as mobile devices. Examples for nodes 110, 120 may include a wireless access point (AP), base station or node B, router, switch, hub, gateway, media gateway, and so forth. In one embodiment, for example, nodes 110, 120 may comprise access points for a WLAN system. Although some embodiments may be described with nodes 110, 120 implemented as an AP by way of example, it may be appreciated that other embodiments may be implemented using other wireless devices as well.

In one embodiment, AP 110, 150 also may provide access to a network 170 via wired communications media. Network 170 may comprise, for example, a packet network such as the Internet, a corporate or enterprise network, a voice network such as the Public Switched Telephone Network (PSTN), among other WANs, for example. The embodiments are not limited in this context.

In one embodiment, system 100 may include node 150. Node 150 may comprise, for example, a mobile device or a fixed device having wireless capabilities. A mobile device may comprise a generalized equipment set providing connectivity to other wireless devices, such as other mobile devices or fixed devices. Examples for node 150 may include a computer, server, workstation, notebook computer, handheld computer, telephone, cellular telephone, personal digital assistant (PDA), combination cellular telephone and PDA, and so forth. In one embodiment, for example, node 150 may comprise a mobile device, such as a mobile station (STA) for a WLAN. In a WLAN implementation, the combination of an AP and associated stations may be referred to as a Basic Service Set (BSS). Although some embodiments may be described with STA 150 implemented as a mobile station for a WLAN by way of example, it may be appreciated that other embodiments may be implemented using other wireless devices as well. For example, node 150 also may be implemented as a fixed device such as a computer, a mobile subscriber station (MSS) for a WMAN, and so forth. The embodiments are not limited in this context.

Nodes 110, 120, 150 may have one or more wireless transceivers and wireless antennas. In one embodiment, for example, nodes 110, 120, 150 may each have multiple transceivers and multiple antennas. The use of multiple antennas may be used to provide a spatial division multiple access (SDMA) system or a multiple-input multiple-output (MIMO) system in accordance with one or more of the IEEE 802.11n proposed standards, for example. Multiple transmitting antennas may be used to increase data rates in a channel or to increase range and reliability of data transmitted in a channel without an increase in data rates. Data rates also may be increased by using multiple antennas to transmit data in multiple channels at the same time. Multiple receiving antennas may be used to efficiently recover transmitted data. The embodiments are not limited in this context.

In general operation, the nodes of system 100 may operate in multiple operating modes. For example, nodes 110, 120, 150 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160. A channel 162, link, or connection may be formed using one or more frequency bands of wireless shared medium 160 for transmitting and receiving packets 164. The embodiments are not limited in this context.

In system 100, STA 150 may communicate with various AP, such as AP 110, 120. To communicate with AP 110 or AP 120, STA 150 may first need to associate with a given AP. Once STA 150 is associated with an AP, STA 150 may need to select a data rate for packets with media and control information over wireless shared media 160. STA 150 may select a data rate once per association, or may periodically select data rates to adapt to transmitting conditions of wireless shared media 160. Adapting data rates to transmitting conditions may sometimes be referred to as rate adaptation operations.

A WLAN such as system 100 may operate at a number of different data rates or data throughputs. For example, original 802.11 systems using DSSS radios offered only two physical data rates of 1 Megabits per second (Mbps) or 2 Mbps. Current WLAN systems operating in accordance with a number of orthogonal frequency division multiplexing (OFDM) techniques, however, may support a wide range of data rates of up to 54 Mbps or more in the 2.4 GHz region. Other potentially higher data rates and transmit modes may be available as well. Examples of such WLAN systems may include 802.11g and 802.11n systems.

In one embodiment, system 100 may comprise scalable and adaptable elements or components to communicate packets 164 via channel 162. In one embodiment, packets 164 may comprise multimedia streaming information, for example. Dynamic variations in channel 162 conditions due to noise, interference, and path loss may impact data throughput and may cause loss of packets 164 during transmission. Furthermore, dynamic changes in the number of users in system 100 each with varying data rate requirements may result in a varying degree of contention and collision in system 100 and may impact the available bandwidth per user or per packet flow. Accordingly, system 100 nodes 110, 120, 150 may require components that are adaptable in real-time at the MAC layer that can adaptively select an appropriate transport layer protocol, such as TCP or UDP, to adapt to varying conditions in system 100. Nodes 110, 120, 150 may be adapted to scalable multimedia applications to improve the performance of system 100 under varying conditions. In one embodiment, capacity improvements in physical and data channel layers of system 100 as well as adaptations of the application and transport layers may be achieved with cross-layer interaction between protocols layers such as the application layer, transport layer, MAC layer, and PHY layer based on knowledge of current system 100 conditions. Scalability in multimedia representations helps system 100 to adapt to such dynamically varying constraints. Node-level and cross-layer optimizations also may be considered to manage end-to-end state and policies across the various layers of the OSI protocol stack, for example.

Due to reductions in data throughput and loss of packets because of poor channel or link conditions nodes 110, 120, 150 comprising wireless communication devices connected to wireless shared media 160 via channel 162 may attempt retransmissions of packets 164 at the MAC layer, for example. Embodiments of system 100 nodes 110, 120, 150 also may provide an adaptable channel 162 and a choice of different modulation and coding schemes at the MAC layer or at the PHY layer to transmit data over wireless shared media 160. In multimedia applications streaming video packets may be transferred over system 100. Some of these streaming video packets may be of higher priority than other packets, which may result in transmission delays associated with prioritized video packets. In addition, nodes 110, 120, 150 of system 100 may select a suitable transport protocol, such as RTP over UDP or TCP, to decide a particular action regarding a given packet, for example. In one embodiment, nodes 110, 120, 150 may comprises components to collect information associated with packets aborted for further transmission attempts at the MAC/PHY layer and may provide such information to upper layers in the protocol stack. In addition, multiple packet retransmission attempts over system 100 may be monitored and a trend may be developed to provide intelligent processing operations in the protocol stack to address these inter-related functionalities.

Accordingly, in one embodiment, system 100 may comprise component 108 in associated nodes 110, 120, 150 to implement techniques to improve packet 164 flow over channel 162 in system 100 in order to improve overall performance in nodes 110, 120, 150, and to increase overall system 100 performance. In one embodiment wireless communication devices such as nodes 110, 120, 150 associated with system 100 may attempt packet 164 retransmissions at the MAC layer. System 100 also may allow channel 162 adaptation and may provide a choice of different modulation and coding schemes at the MAC or the PHY layer that may be used for packet 162 transmission via channel 162 over wireless shared media 160. In one embodiment, system 100 may transmit prioritized packets. For example, some video packet streams transferred over system 100 may comprise prioritized packets where some packets have a higher priority than other packets. Transmission delays associated in the transmission of such prioritized packets may impact the overall bandwidth and performance of system 100. In addition, the particular transport protocol may be considered in deciding what action to take for a given packet 164. In one embodiment, RTP over UDP may be used as the transport protocol. In one embodiment, information associated with aborted packet 164 retransmission attempts of packets at the MAC/PHY layer may be provided to the upper layers in the protocol stack. In addition, if component 108 detects a significant number of consecutive packet errors and attempts multiple packet 164 retransmissions, system 100 may attempt more robust transmission schemes, for example. In one embodiment, component 108 may monitor this trend and use it as an early warning indicator of failing channel conditions in system 100. In one embodiment, component 108 may execute intelligent processing operations in the protocol stack to provide the inter-related functionalities discussed above. Accordingly, techniques to improve such intelligent processing operations may therefore improve overall performance of nodes 110, 120, 150 and component 108 in system 100. Component 108 may be described in more detail with reference to FIG. 2. In one embodiment, priority packets may be mapped according to retry count where higher priority data packets may be retried based on the available scheduled deadline and where lower priority data packets either may be retried less frequently or may be discarded, for example. In one embodiment, an overall "delay buffer budget" may be maintained by the transmitting side and a receive playback buffer limit may be maintained on the receiver. The embodiments, however, are not limited in this context.

Figure 2:
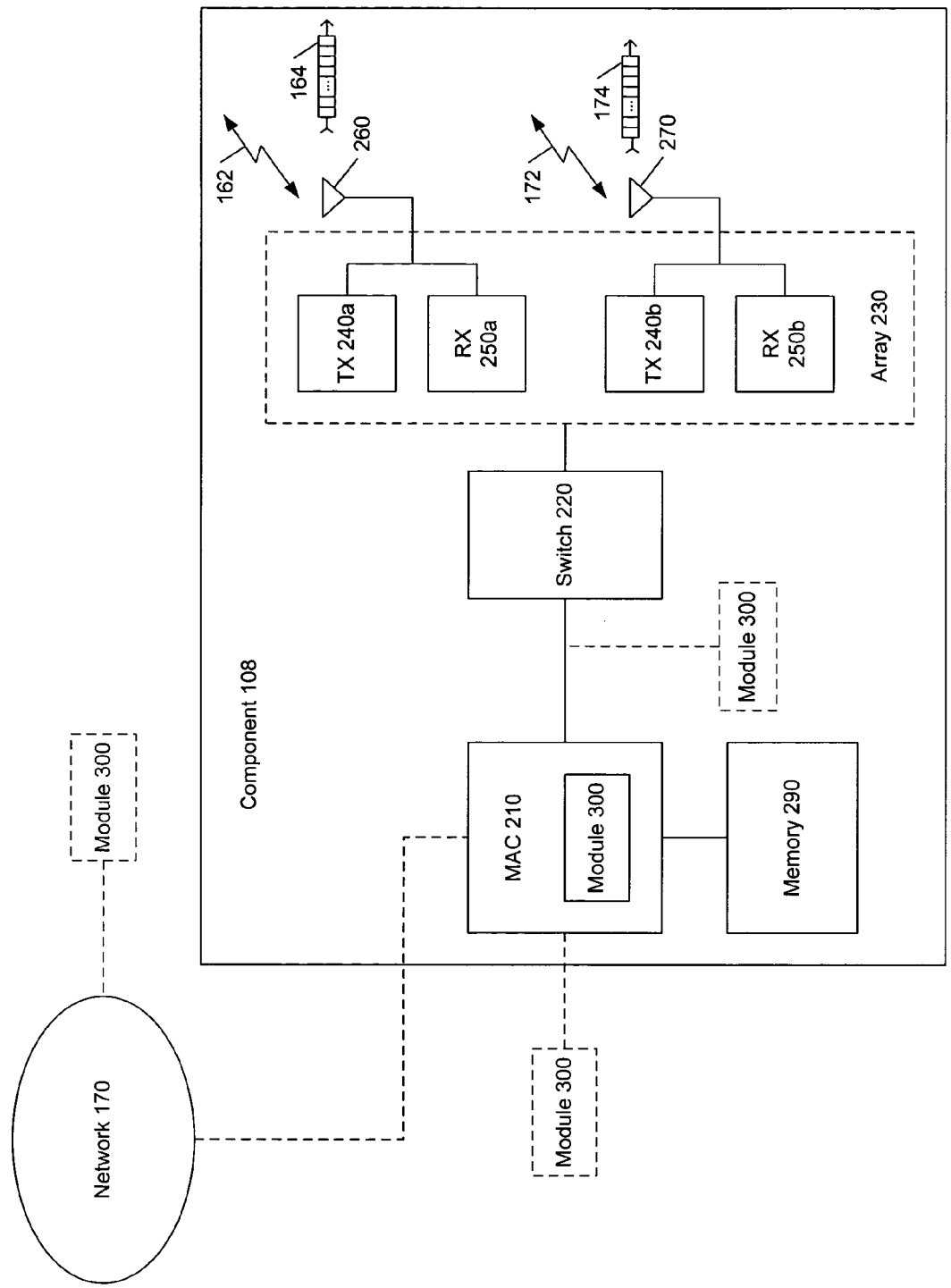
FIG. 2 illustrates one embodiment of a component.

FIG. 2 illustrates one embodiment of a component. FIG. 2 may illustrate a block diagram for component 108 of system 100, for example. Component 108 may be implemented as part of nodes 110, 120 or 150 as described with reference to FIG. 1. As shown in FIG. 2, component 108 may comprise multiple elements, such as processor 210, switch (SW) 220, transceiver array 230, and memory 290. In one embodiment, component 108 also may comprise module 300. Some elements may be implemented using, for example, one or more circuits, components, registers, processors, software subroutines, or any combination thereof. Although FIG. 2 shows a limited number of elements, it can be appreciated that more or less elements may be used in component 108 as desired for a given implementation. The embodiments are not limited in this context.

In one embodiment, component 108 may include transceiver array 230. Transceiver array 230 may be implemented as, for example, a MIMO system. MIMO system 230 may include two transmitters 240a and 240b, and two receivers 250a and 250b. Although MIMO system 230 is shown with a limited number of transmitters and receivers, it may be appreciated that MIMO system 230 may include any desired number of transmitters and receivers. The embodiments are not limited in this context.

In one embodiment, transmitters 240a-b and receivers 250a-b of MIMO system 230 may be implemented as OFDM transmitters and receivers. Transmitters 240a-b and receivers 250a-b may communicate packets 164, 174, respectively, with other wireless devices over channels 162, 172, respectively. For example, when implemented as part of AP 110 or AP 120, transmitters 240a-b and receivers 250a-b may communicate packets 162, 164 with STA 150. When implemented as part of STA 150, transmitters 240a-b and receivers 250a-b may communicate packets 164, 174 with AP 110 or AP 120. The packets may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240a and receiver 250a may be operably coupled to an antenna 260, and transmitter 240b and receiver 250b may be operably coupled to antenna 270. Examples for antenna 260 and/or antenna 270 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. In one embodiment, system 100 may be implemented as a MIMO based WLAN comprising multiple antennas to increase throughput and may trade off increased range for increased throughput. MIMO-based technologies may be applied to other wireless technologies as well. Although in one embodiment system 100 may be implemented as a WLAN in accordance with 802.11a/b/g/n protocols for wireless access in an enterprise, other embodiments in use in the enterprise may include reconfigurable radio technologies and/or multiple radios (e.g., multiple transceivers, transmitters, and/or receivers), for example. The embodiments are not limited in this context.

In one embodiment, component 108 may include a processor 210. Processor 210 may be implemented as a general purpose processor. For example, processor 210 may comprise a general purpose processor made by Intel® Corporation, Santa Clara, Calif. Processor 210 also may comprise a dedicated processor, such as a controller, microcontroller, embedded processor, a digital signal processor (DSP), a network processor, an input/output (I/O) processor, a media processor, and so forth. The embodiments are not limited in this context.

In one embodiment, processor 210 may comprise module 300. In one embodiment, module 300 may comprise an adaptive cross-layer manager to control the transmission of packets 164, 174 in channels 162, 172, respectively, of a wireless network such as system 100. In one embodiment module 300 may receive real-time information about channels 162, 172 from a lower physical layer in the protocol stack, such as the PHY layer (i.e., OSI Physical Layer 1), and may receive packets 164, 174 from upper layers of the protocol stack. For example, module 300 may receive packets 164, 174 from any one of OSI layers 3-7 (i.e., Network Layer 3, Transport Layer 4, Session Layer 5, Presentation Layer 6, and/or Application Layer 7) and/or from TCP/IP protocol layers, although the embodiments are not limited in this context. Module 300 may adapt transmission of packets 164, 174 based on the real-time information about channels 162, 172 and the contents or payloads of packets 164, 174, for example. Although module 300 is shown as part of processor 210, module 300 may be part of the PHY layer, the MAC layer, may reside anywhere on or off component 108 anywhere in system 100 nodes, or may be remotely distributed in other nodes associated with network 170, for example. Embodiments of module 300 may be described in more detail with reference to FIG. 3 below.

In one embodiment, component 108 may include a memory 290. Memory 290 may comprise any machine-readable or computer-readable media capable of storing data, including both volatile and non-volatile memory. For example, the memory may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

In one embodiment, nodes 110, 120, 150 of system 100 may operate in accordance with one or more of the IEEE 802.11 series of specifications. A wireless device operating in accordance with an IEEE 802.11 specification may require the implementation of at least two layers. One layer is the 802.11 MAC layer (i.e., OSI Data/Link Layer 2). In general, the MAC layer manages and maintains communications between 802.11 devices by coordinating access to a shared radio channel and utilizing protocols to enhance communications over wireless shared media 160. For example, the MAC layer may perform such operations as scanning for 802.11 devices, authenticating 802.11 devices, associating an AP with a STA, performing security techniques such as wireless encryption protocol (WEP), request to send (RTS) and clear to send (CTS) operations to access wireless shared media 160, power saving operations, fragmentation operations, and so forth. Another layer is the 802.11 PHY layer (i.e., OSI Physical Layer 1). The PHY layer may perform the operations of carrier sensing, transmission, and receiving of 802.11 frames. For example, the PHY layer may integrate operations such as modulation, demodulation, encoding, decoding, analog-to-digital conversion, digital-to-analog conversion, filtering, and so forth. The PHY layer is typically implemented using dedicated hardware. The MAC layer, however, is typically implemented using a combination of dedicated hardware and dedicated software. In one embodiment, module 300 may provide cross-layer adaptation between any of the layers in the OSI protocol stack. For example, module 300 may provide cross-layer adaptation between the application layer and the MAC/PHY layers with direct exchange of information between the layers, and adaptation feedback between the layers. A common information base may e used to share information between the layers, for example. Actions may be taken by any of the payers with feedback from the various layers, for example.

In one embodiment, processor 210 may be arranged to perform MAC layer operations. For example, processor 210 may be implemented as a media access control (MAC) processor. MAC 210 may be arranged to perform MAC layer processing operations. In addition, MAC 210 may be arranged to select a data rate to communicate media and control information between wireless devices over wireless shared media 160 in accordance with one or more WLAN protocols, such as one or more of the IEEE 802.11n proposed standards, for example. The embodiments, however, are not limited in this context.

When implemented in a node of system 100, component 108 may be arranged to communicate information in wireless shared media 160 between the various nodes, such as AP 110, AP 120, and STA 150. The information may be communicated in the form of packets 164, 174 over channels 162, 172 established, with each packet 164, 174 comprising media information and/or control information. The media and/or control information may be represented using, for example, multiple OFDM symbols. Packets 164, 174 may be part of a frame, which in this context may refer to any discrete set of information, including a unit, packet, cell, segment, fragment, and so forth. The frame may be of any size suitable for a given implementation. Typical WLAN protocols use frames of several hundred bytes, and an 802.11 frame may have a length of up to 1518 bytes or more, for example. In one embodiment, nodes of system 100 and component 108 may be arranged to communicate information over wireless shared media 160 between the various nodes, such as AP 110, AP 120, and STA 150. Although embodiments describe communication of information in the form of packets 164, 174 over wireless channels 162, 172, the embodiments are not limited in this context.

When implemented as part of STA 150, MAC 210 may be arranged to associate with an AP. For example, MAC 210 may passively scan for access points, such as AP 110, 120. AP 110, 120 may periodically broadcast a beacon. The beacon may contain information about the access point including a service set identifier (SSID), supported data rates, and so forth. MAC 210 may use this information and the received signal strength for each beacon to compare AP and decide upon which one to use. Alternatively, MAC 210 may perform active scanning by broadcasting a probe frame, and receiving probe responses from AP 110, 120. Once an AP has been selected, MAC 210 may perform authentication operations to prove the identity of the selected AP. Authentication operations may be accomplished using authentication request frames and authentication response frames. Once authenticated, STA 150 associates with the selected AP before sending packets. Association may assist in synchronizing STA 150 and the AP with certain information, such as supported data rates. Association operations may be accomplished using association request frames and association response frames containing elements such as SSID and supported data rates. Once association operations are completed, STA 150 and AP 110 can send packets to each other, although the embodiments are not limited in this regard.

In some embodiments, MAC 210 also may be arranged to select a data rate to communicate packets based on current channel 162, 172 conditions for wireless shared media 160. For example, assume STA 150 associates with a peer, such as an AP or other wireless device (e.g., AP 110). STA 150 may be arranged to perform receiver directed rate selection. Consequently, STA 150 may need to select a data rate to communicate packets 164, 174 between STA 150 and AP 110 prior to communicating the packets 164, 174.

Figure 3A:
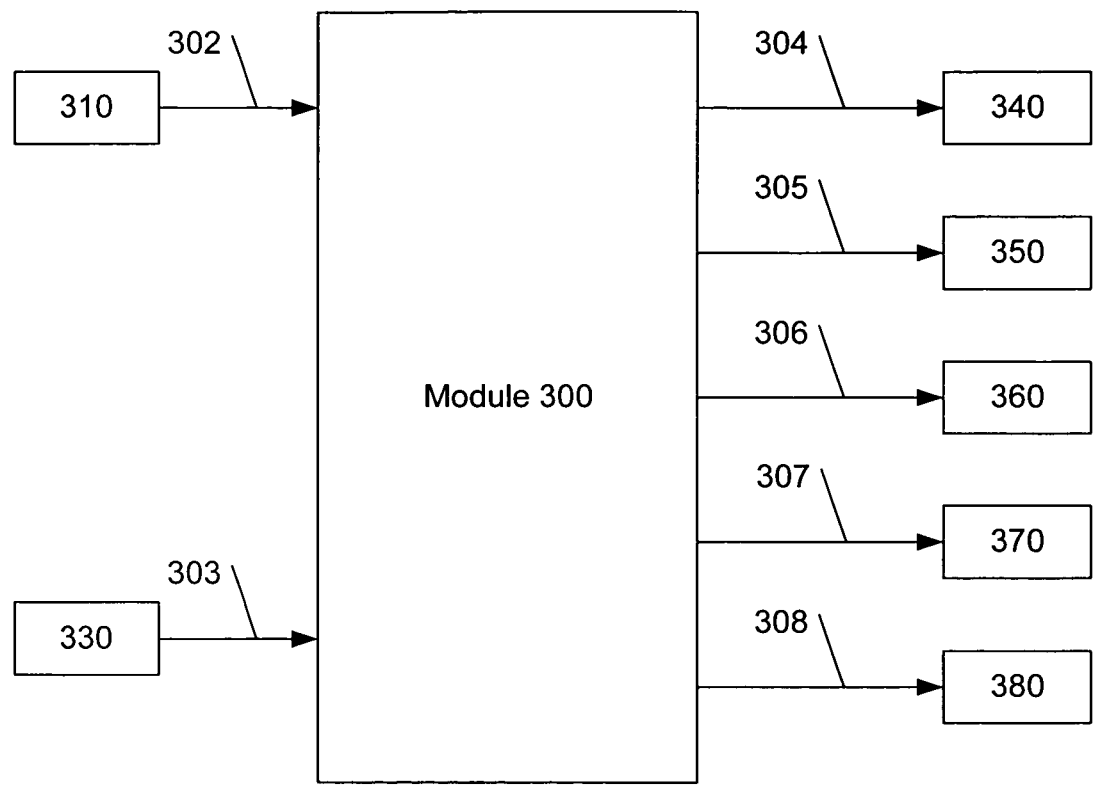
FIG. 3A illustrates one embodiment of a module.

FIG. 3A illustrates module 300 comprising several inputs and outputs. In one embodiment, module 300 may function as an adaptive cross-layer module to control information flow across the MAC and PHY layers, and other layers within a given protocol stack, for example. In one embodiment, module 300 may be configured to adapt to multiple modulation and coding schemes and transmissions, manage retransmissions for packets 164, 174, including, for example, prioritized packets, and may include functionality to signal packet transmission abortion and provide an early warning signal of failing conditions in channels 162, 172, among other functions, for example. Embodiments of module 300 may control cross-layer MAC/PRY packet 164, 174 transmissions in channels 162, 174, respectively, of system 100 (FIG. 1) (e.g., WLAN), packet 164, 174 transmission abortion, and may provide early warning signal indications based on real-time conditions in channels 162, 172. In one embodiment, module 300 may select a specific modulation and coding schemes and transmission attempts for a packet 164, 174, decide whether to abort a packet transmission, to signal such an abortion, and also to signal an early warning indicator about failing channel 162, 172 conditions to enable channel switching with prolonged consecutive failed packets. Although, information may be transmitted in the form of multiple packets 164, 174 via multiple channels 162, 172 established within wireless media 160, hereinafter the description may refer to a single packet 164 being transmitted over a single channel 162 for ease of understanding, although those skilled in the art will appreciate that embodiments of module 300 are not limited in this context. In one embodiment, channel conditions may be inferred by a combination of acknowledges (ACKs) that are not returned, failed cyclic redundant code (CRC) or FCS (frame check sequence) as well RSSI (received signal strength), for example. If the deadline from the sending application is about to expire, for example, it may inform the application to stop sending low priority packets or send them at lower rate. Also, it may look at a scalable multi-layer coder/decoder (codec) and only send base layer versus enhancement layer as well.

Figure 3B:
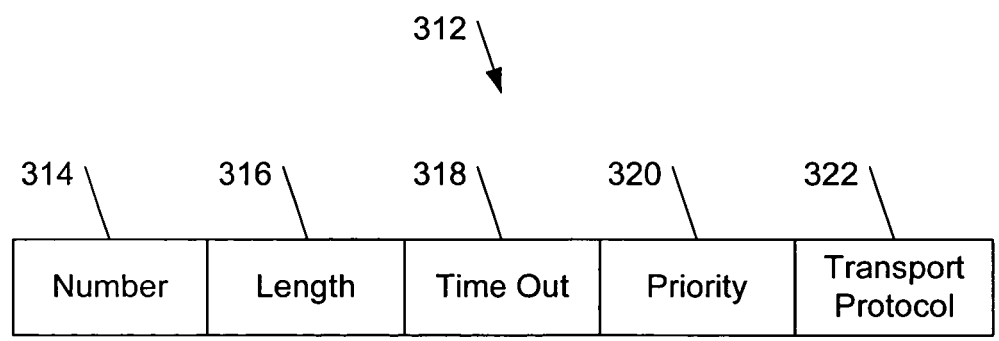
FIG. 3B illustrates one embodiment of a packet quintuplet.

FIG. 3B illustrates one embodiment of a packet quintuplet 312. In one embodiment, module 300 may receive, in real-time, a list 310 of pending packets at input 302. In one embodiment, each packet 164 available for transmission may be represented by a quintuplet 312, which may include, for example, information associated with packet 164, such as packet number 314, length 316, timeout 318, priority level 320, and transport protocol 322, for example. It will be appreciated that there may be additional or fewer items of information contained in each quintuplet 312. Furthermore, packets 164 may be configured in any order based on the particular implementation.

With reference now back to FIG. 3A, in one embodiment, module 300 also receives channel information 330 at input 303. Channel information 330 may comprise information about channel 162 including link quality Signal to Interference and Noise Ratio (SINR) and expected Packet Error Rate (PER) for each modulation and coding scheme as links and channels may be established between any of the nodes 110, 120, 150 in wireless shared media 160, for example. In one embodiment, channel information 330 may be received at input 303 in real-time or substantially in real-time. Module 300 also may provide modulating and coding scheme 340 at output 304, number of transmission attempts 350 at output 305, packet abortion signal 360 at output 306, an early warning signal 370 at output 307, and a PHY feedback signal 380 at output 308 to indicate packet transmission failure or success, for example.

For packets of different priority levels from another layer in the protocol stack, module 300 (e.g., adaptive cross-layer module) may receive optional input suggestions on modulation and coding schemes, and retransmission limits to use, and whether a packet is allowed to be aborted or not. Cross-layer module 300 may use such input suggestions in its decision-making process, and may adopt these suggestions or override these suggestions.

Module 300 (e.g., adaptive cross-layer module) may receive queries from other layers in the protocol stack about the status of a packet queued up for transmission. In response to the queries, module 300 may respond with information about (a) whether the packet was successfully transmitted or (b) whether it was aborted and how many transmissions were attempted before abortion, or (c) whether the packet is still waiting in queue for transmission and the number of transmission attempts that have been made for the packet.

Module 300 (e.g., adaptive cross-layer module) may be used at a source node and at any of the intermediate nodes in the end-to-end path for wireless communication.

Module 300 (e.g., adaptive cross-layer module) the choice of the number of modulation and coding schemes, and retransmission limits, can vary depending on the wireless link being used for transmission. An intermediate node in a wireless network such as an access point could use different links depending on the end-to-end path chosen for routing different packets. Therefore, there may be different instantiations of module 300 for each of the links to take appropriate decisions for each of the links. For scalability in implementation, the instantiation of module 300 may be implemented in software, with sufficient hardware resources such as memory available for each of the instantiations to process information.

Embodiments of module 300 may provide multiple adaptation mechanisms to vary modulation and coding schemes or to vary retransmission limits. In one embodiment, a single control module 300 may provide a mechanism for packet 164 transmission attempts associated with a particular MCS scheme and a retry-limit for such transmissions attempts based on real-time channel 162 information received at channel information input 330. Module 300 can abort transmissions of packets 164 and signal the abortion to higher layers in the protocol stack. When signaling abortion of a packet, the number of transmission attempts made, and the modulation and coding schemes attempted for transmission can be optionally provided. Further, module 300 can monitor successive failed packets to provide an early warning of failing channel conditions. Such failing conditions can be used to reduce the application rate being used for transmission.

In one embodiment, module 300 may comprise a cross-layer adaptive module to provide differential control for packet transmissions and adaptive modulation for prioritized packet traffic that may be transport-protocol aware. Module 300 also may provide transmission abortion information about a packet and may provide an early warning indication of worsening channel conditions with respect to wireless multimedia packet transmissions over system 100 (FIG. 1), such as a WLAN, for example.

In one embodiment, channel information 330 may include statistics related to channel or link quality from the PHY/MAC protocol stack layers. The link quality information may comprise, for example, the current SINR in the wireless link established in wireless shared media 160 to transmit packet 164, such as channel 162, and a mapping of expected physical layer PERs for each of the available modulation and coding schemes. The information associated with channel 162 may be provided to module 300 based on the most recent transmissions over wireless shared media 160.

In one embodiment, module 300 may receive a list 310 of pending packets 164 to be transmitted. In one embodiment, a pending packet 164 available for transmission may be represented by a quintuplet 312, comprising: (1) Packet Number 314; (2) Packet Length 316; (3) Packet Timeout 318; (4) Packet Priority 320; and (5) Transport Protocol 322. Packet number 314 indicates the index of packet 164 in the transmission flow. Packet length 316 is the number of information bytes contained in packet 164. Packet timeout 318 is the estimated time at the transmission node after which transmission of packet 164 may be aborted. Assuming that there are M possible priority levels, depending on the importance of one packet relative to other packets and each packet is assigned one of these priority levels, the Transport Protocol 322 field may help to differentiate between reliable transport mechanisms such as TCP and unreliable transport mechanisms such as UDP. For reliable transport mechanisms such as TCP, it may be advantageous to make more attempts at the MAC layer for all packets to avoid incurring TCP-level retransmission timeouts. For an unreliable transport mechanism such as UDP, transmitted packets 164 may be lost, and hence module 300 may treat them differently. Accordingly, the transport protocol associated with each packet 164 may be provided to module 300, for example. Although information associated with packet 164 may be described with respect to quintuplet 312, which is a unit of five discrete characteristics associated with packet 164, this is in no way intended to limit the unit in quantity or type of information that may be contained therein. For example, quintuplet 312 may comprise a unit of multiple discrete pieces of information characterizing or associated with one or more packets 164, such as, for example, a distortion measure associate with a packet or a group of packets.

The number of attempted retransmissions impacts the overall performance of system 100. The decision to select a particular number of retransmissions per packet is a function of several factors that should be considered substantially simultaneously in system 100. Several retransmission attempts for a given packet may impact other packets waiting in a packet transmission queue. Packets in the queue waiting to be processed or transmitted may be intended for different destinations in a wireless network, such as system 100. Packets intended for the same destination may have different priorities amongst themselves. Higher priority packets may have a longer retry period. If there are multiple application sessions running in parallel, however, the relative priority between these sessions may be taken into consideration by module 300. Module 300 may analyze and/or process packets 164 intended for different destinations based on the quality of the channels 162 and the end-to-end throughput associated with those transmissions.

Module 300 may analyze and/or process packets 164 based on the relative availability of wireless system 100 considering other transmissions therein. The transmission time for packet 164 may be impacted by the quality of wireless channel 162 in wireless shared media 160 and/or the current modulation and coding scheme being employed in the particular transmission. For example, more robust current modulation and coding schemes generally require a longer transmission time. Accordingly, module 300 may be adaptable based on the current transport mechanism, the priority of packets 164 being transmitted, the available performance in wireless system 100 and channel 162, the transmission duration based on modulation and the coding schemes used, the link adaptation scheme being used, other active sessions in wireless system 100, and the quality of wireless channel 162 used for various transmissions within wireless shared media 160.

Specific functionality of module 300 may vary in accordance with particular embodiments that may be described in further detail below. Embodiments of module 300 may comprise: (1) jointly adapting for retransmissions and modulation and coding schemes used in a particular channel 162; (2) a packet abort signal when a packet transmission is aborted; and (3) an early warning indicator signal to trigger a failure in a current channel 162 and switching transmission to a different channel. These specific embodiments, however, are neither exhaustive nor exclusive as other embodiments may be substituted, added or combined therewith.

One embodiment of module 300 also may be jointly adaptable to retransmissions and modulation and coding schemes. In one embodiment, assume there are several users, including a specific user A that is transmitting packets 164, involved in wireless transmissions between any nodes 110, 120, 150 or networks 170 in system 100 (e.g., WLAN) over channel 162. In one embodiment, module 300 may include a packet transmission retry-limit adaptation scheme to ascertain the time available for retransmitting packet 164 for user A relative to the data rates for all other users connected to system 100. For example, for a total time period of $T_{total}$, only time $T_{avail}$ may be available to transmit packet 164 to user A. A portion of $T_{avail}$ may be used to account for back-off times and protocol overhead such as interframe spacing, for example, while the remaining time may be used to actually transmit packet 162 in the physical medium, such as wireless shared media 160. The idle time of system 100, $T_{idle}$, may be represented as $T_{idle} = T_{total} - T_{avail}$. If system 100 is saturated with communications, there may be very little idle time available and $T_{idle}$ may be the time utilized by other users in system 100. If utilization of system 100 by other users decreases (e.g., if a user leaves system 100 or if channel 162 conditions for other users improves so that transmissions may be completed faster) then user A may utilize any of the idle time, $T_{idle}$, to increase the time available for transmitting packets 164.

Within the time available to user A, $T_{avail}$, an appropriate amount of time may be allocated for transmitting packets having higher and lower priority, taking into account the packet retransmission time. Assume that P is the PER for the PHY layer. Equations (1a) and (1b) below provide:

$$f(P)=1+P+P^2+P^3+\ldots=1/(1-P) \qquad (1a)$$

$$f'(P)=1+2P+3P^2+\ldots=1/(1-P)^2 \qquad (1b)$$

Given the expected PER for each modulation and coding scheme based on current system 100 channel 162 quality and statistics, the average number of transmissions $\alpha(P)$ that may be required for a PER of P may be provided by equation (2) as follows:

$$\alpha(P)=(1-P)+2P(1-P)+3P^2(1-P)+4P^3(1-P)+\ldots=(1-P)f'(P)=1/(1-P) \qquad (2)$$

The variance of the number of transmissions is given by $\beta(P)$ for a PER of P may be provided by equations (3a) and (3b). The variance $\beta(P)$ provides a measure of the square of the mean deviation from the average of the number of transmissions.

$$g(P)=Pf'(P) \qquad (3a)$$

$$\beta(P)=(1-P)g'(P)-(\alpha(P))2=P/(1-P)2. \qquad (3b)$$

The PER for low priority packets using less robust modulation and coding schemes may be higher. Therefore, the average number of retransmissions per packet 164 also may be higher. In one embodiment, the transmission retry limit for packets 164 with higher PER values may be set to a relatively low value of 1 or 2 retransmission attempts to avoid incurring significant retransmission time overhead required for low priority packets using less robust modulation and coding schemes. In contrast, high priority packets may be sent using more robust modulation and coding schemes because the robust schemes may not require many retransmissions. Accordingly, the retry limit for high priority packets using relatively more robust modulation and coding schemes may be set to a relatively larger value greater than 2 retransmission attempts, for example. Accordingly, different modulation and coding schemes may require different transmission times, with the more robust schemes requiring longer transmission time. Packets with different priorities can be assigned to different modulation and coding schemes. Module 300 may utilize several functions ($F_1$, $F_2$, $F_3$ described below), which may be defined as a many-to-one mapping of: (1) priority levels to available modulation and coding schemes ($F_1$); (2) priority levels to possible values of retransmission retry limits ($F_2$); and (3) modulation and coding scheme with its associated PER ($F_3$).

Function $F_1$(Priority, MCS) may be defined as a many-to-one mapping of priority levels (Priority) to available modulation and coding schemes (MCS) and the mapping may vary dynamically based on the quality of channel 162 contained in the channel information 330 received by module 300 at input 303 (e.g., link quality, expected PERs for each MCS). The modulation and coding scheme assigned to packet 164 is based on its priority level, the conditions of channel 162, and the desired robustness required for transmitting packet 164 according to its priority.

Function $F_2$(Priority, RetryLimit) may be defined as a many-to-one mapping of priority levels (Priority) to possible values of retransmission retry limits (RetryLimit), e.g., the maximum number of retransmission attempts that will be made on a per packet basis. This mapping also may vary dynamically based on the quality of channel 162 contained in the channel information 330 received by module 300 at input 303.

Function $F_3$(MCS, $P_e$) may be defined as a one-to-one mapping of each modulation and coding scheme (MCS) with its associated PER ($P_e$). This function may be generated based on information available about the SINR of channel 162, and the dependence of the PER as a function of the SINR for each modulation and coding scheme. Then $\alpha(P_e)$ may represent the expected number of transmissions required for the chosen modulation and coding scheme with of PER of $P_e$.

The concepts discussed above may be illustrated by way of example. In one embodiment, assume that N packets are available for transmission in channel 162 within a time window T, numbered 1, 2, ..., k, ..., N. Further assume that the priority level of packet k is $P_k$. The expected transmission time for packet k may be defined as $T_k$ (where 1<k<N) and the packets may be ordered in non-increasing order of priority (i.e., a packet in the ordered list may have a priority equal to or less than the previous packet). Equation (4) below defines the overall time required for a packet transmission attempt, which may include the actual PHY layer transmission time based on the selected modulation and coding scheme, knowledge about current overheads of back-off time, protocol overhead such as interframe spacing, and the time required for other user transmission traffic in wireless shared media 160.

$$T_{all}=(T_{phy}+T_{backoff}+T_{protocoloverhead}+T_{othertransmissions}) \quad (4)$$

Such information may be obtained based on statistics generated from prior packet transmissions $P_1$ to $P_{k-1}$ in wireless shared media 160, for example. The expected transmission time $T_k$ for packet $P_k$ based on the expected number of retransmissions $\alpha(P_e)$ may be defined in equation (5) below by the product of $\alpha(P_e)$ and $T_{all}$ as follows:

$$T_k=\alpha(P_e)T_{all} \quad (5)$$

Accordingly, to transmit all packets $P_k$, for k=1 to N, in the available time the sum of the expected transmission times should be less than or equal to the total available time, which may be defined in equation (6) as follows:

$$\Sigma_{k=1,N}T_k \leq T_{avail} \quad (6)$$

If the constraint in equation (6) cannot be met, then the number of packets L, which in one embodiment the packets may be ordered in non-increasing order of priority, that may be transmitted in the given time window may be determined by solving for L according to equations (7a) and (7b) as follows:

$$\Sigma_{k=1,L}T_k \leq T_{avail} \text{ and} \quad (7a)$$

$$\Sigma_{k=1,(L+1)}T_k > T_{avail} \quad (7b)$$

In general, when a particular packet 164 is scheduled for transmission in channel 162, the earliest packet may be selected at the highest priority level among all the packets available for transmission. An appropriate modulation and coding scheme and packet transmission retry-limit also may be selected to attempt transmission of packet 164. During this process a pending packet in a waiting queue that exceeds the specified timeout limit for that packet may be discarded from the list for any further transmission attempts.

Accordingly, one embodiment of module 300 may provide a packet abort signal, for example. In one embodiment, when a packet transmission is aborted, module 300 may provide direct feedback by way of packet abort signal 360 to upper layers in the protocol stack. These upper layers may include, for example, the transport layer (e.g., layer 4 in the OSI reference model) or the application layer (e.g., layer 7 in the OSI reference model), or any other layers therebetween (e.g., session layer 5 or presentation layer 6 in the OSI reference model). The packet abort signal 360 provides information associated with the inability of the lower protocol layer to transmit the packet to the upper protocol layers. For example, in one embodiment, the packet abort signal 360 may indicate to application layer 7 that the MAC layer (e.g., layer 2 in the OSI reference model) or the PHY layer (e.g., layer 1 in the OSI reference model) cannot transmit the packet and all retransmission attempts for that particular packet have been aborted. Module 300 may provide packet number 314 and its priority level 320 along with packet abort signal 360 to upper layers in the protocol stack that may utilize this information.

For example, an upper protocol layer may use packet abort signal 360 to trigger a packet retransmission from a higher layer in the protocol stack. In one embodiment, a multimedia application may use packet abort signal 360 to adapt with the knowledge that a packet was not transmitted. Accordingly, the multimedia application may adapt and determine to transmit any information that may have been dependent on a currently aborted packet in future transmission attempts, for example. In multimedia applications, this functionality may improve overall video quality at any of the receivers 250a, b, (FIG. 2) in any of the nodes of system 100, for example.

In one embodiment, module 300 may provide an early warning indicator signal to trigger channel failure and possible channel switching. When using a reliable transport protocol such as TCP, as opposed to less reliable transport protocols such as UDP, even the loss of a single packet may trigger a TCP retransmission timeout window, which may be in the order of a few seconds, e.g., 3 seconds. It may be desirable, therefore, to attempt additional transmissions at the MAC-layer to send out the packet across the MAC-layer. Module 300 may execute a link adaptation method to attempt further retransmissions using more robust modulation and coding schemes until the most robust scheme is selected and packet transmission is successful. In one embodiment, component 108 may wait until a temporary interference in the channel is resolved before successfully transmitting a packet. Alternatively, a permanent failure in the channel may indicate that module 108 should attempt switching to a different wireless channel for transmission. For example, if a permanent failure occurs in current channel 162, component 108 may switch transmission to channel 172. Permanent channel failure may include, for example, prolonged interference in the channel or a permanently failed channel. For example, if a transmission attempt requires 2 ms, 100 consecutive transmission attempt failures may indicate a prolonged interference condition in the channel or a permanently faded channel. Module 300 may track the number of transmission attempts 350. Successive multiple failed transmissions tracked by module 300 may be used to generate early warning signal 370 to indicate that is a channel is about to fail to upper layers (i.e., OSI layers 3-7) of the protocol stack. Transmitting node 110, 120, or 150 then may use early warning signal 370 to attempt alternative transmission strategies such as attempting to locate a better transmission channel rather than continuing transmission attempts in the current channel. Those skilled in the art will appreciate that successive failed transmissions may be monitored by module 300 for any transport protocol, and for a given packet or across multiple packets, before early warning signal indicator 370 is triggered.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
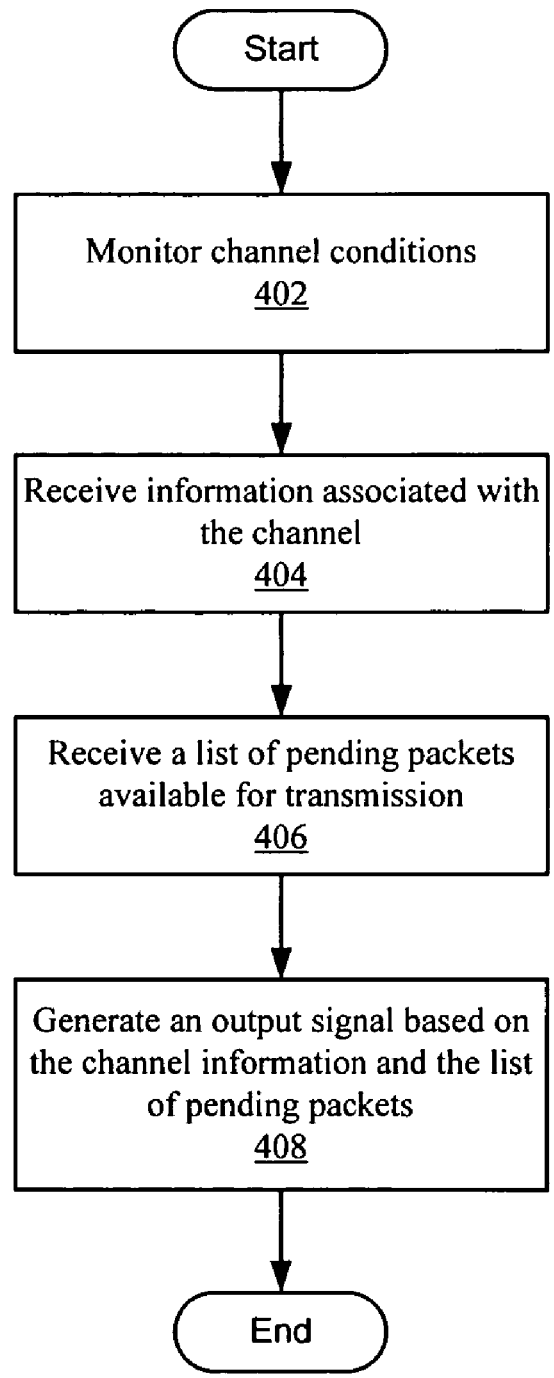
FIG. 4 illustrates one embodiment of a logic flow.

FIG. 4 illustrates one embodiment of a logic flow. FIG. 4 may illustrate a block flow diagram of a logic flow 400. Logic flow 400 may be representative of the operations executed by one or more systems described herein, such as component 108 as implemented as part of nodes 110, 120 or 150, for example. Logic flow 400 may form a portion of an article comprising a machine-readable storage medium containing instructions that if executed enable a system to perform all or portions of the logic flow 400. As shown in logic flow 400, channel conditions may be monitored at 402. Information associated with the channel may be received at 404. In one embodiment, the channel information may comprise statistics related to link quality from at least one of a physical protocol layer and a data link protocol layer. In one embodiment, the channel information may comprise current signal to interference and noise ratio, and a mapping of physical layer packet error rates for each available modulation and coding schemes. A list of pending packets available for transmission may be received at 406. In one embodiment, the list of pending packets available for transmission may comprise at least one of a packet number, packet length, packet timeout, packet priority, and transport protocol for each of the pending packets. And an output signal based on the channel information and the list of pending packets may be generated at 408. In one embodiment, logic flow 400 may jointly adapt for packet retransmissions and modulation and coding schemes based on said received information associated with said channel and said received list of pending packets available for transmission. In one, embodiment, logic flow 400 may provide a packet transmission abort signal to at least one protocol layer when a packet transmission is aborted. In one embodiment, logic flow 400 may provide an early warning signal to at least one protocol layer to indicate channel failure and to switch transmission to a different channel. The embodiments are not limited in this context.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radio-telephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, FHSS or DSSS OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
 a control module to manage transmission of packets in a channel of a wireless network, said control module to receive real-time information about said channel, said control module to adapt transmission of said packets based on said information;

wherein said control module provides an early warning signal to trigger a channel failure and to control channel switching, and wherein each of said packets is represented by a packet quintuplet, wherein said quintuplet comprises a packet number, a packet length, a timeout period, a packet priority, and a transport protocol associated with said packet, said transport protocol used by said control module to differentiate between reliable and unreliable transport mechanisms and to establish a number of retry transmissions for said packets based on said transport mechanism reliability.

2. The apparatus of claim 1, wherein said channel information comprises at least one of a link quality signal to interference and noise ratio (SINR) and expected packet error rate (PER) for each modulation and coding scheme.

3. The apparatus of claim 2, wherein said packets are assigned a priority and said priority is mapped to an available modulation and coding scheme.

4. The apparatus of claim 2, wherein said packets are assigned a priority and said priority is mapped to values of packet retransmission limits, wherein higher priority packets are retried based on available scheduled deadline and wherein lower priority packets are either retried less often or are discarded.

5. The apparatus of claim 2, wherein said packets assigned a modulation and coding scheme mapped to a packet error rate associated with said modulation and coding scheme.

6. The apparatus of claim 1, wherein said control module provides a packet abort signal.

7. A system, comprising:

an antenna; and a control module to couple to said antenna, said control module to manage transmission of packets in a channel of a wireless network, said control module to receive real-time information about said channel, said control module to adapt transmission of said packets based on said information, wherein said control module provides an early warning signal to trigger a channel failure and to control channel switching;

wherein each of said packets is represented by a packet quintuplet, wherein said quintuplet comprises a packet number, a packet length, a timeout period, a packet priority, and a transport protocol associated with said packet, said transport protocol used by said control module to differentiate between reliable and unreliable transport mechanisms and to establish a number of retry transmissions for said packets based on said transport mechanism reliability.

8. The system of claim 7, wherein said channel information comprises at least one of a link quality signal to interference and noise ratio (SINR) and expected packet error rate (PER) for each modulation and coding scheme.

9. The system of claim 8, wherein said packets are assigned a priority and said priority is mapped to an available modulation and coding scheme.

10. The system of claim 8, wherein said packets are assigned a priority and said priority is mapped to values of packet retransmission limits.

11. The system of claim 8, wherein said packets assigned a modulation and coding scheme mapped to a packet error rate associated with said modulation and coding scheme.

12. The system of claim 7, wherein said control module provides a packet abort signal.

13. A method, comprising:

monitoring, at a control module, channel conditions;

receiving, at the control module, information associated with said channel;

receiving, at the control module, a list of pending packets available for transmission, wherein receiving the list of pending packets available for transmission comprises receiving a packet number, packet length, packet timeout, packet priority, and transport protocol for each of the said pending packets;

differentiating, by the control module, between reliable and unreliable transport mechanisms;

establishing, by the control module, a number of retry transmissions for said packets based on said transport mechanism reliability generating, by the control module, an output signal based on said channel information and said list of pending packets; and providing, by the control module, an early warning signal to at least one protocol layer to indicate channel failure and to switch transmission to a different channel.

14. The method of claim 13, wherein receiving said channel information comprises receiving statistics related to link quality from at least one of a physical protocol layer and a data link protocol layer.

15. The method of claim 14, wherein receiving said channel information comprises receiving current signal to interference and noise ratio, and a mapping of physical layer packet error rates for each available modulation and coding schemes.

16. The method of claim 13, comprising jointly adapting for packet retransmissions and modulation and coding schemes based on said received information associated with said channel and said received list of pending packets available for transmission.

17. The method of claim 13, comprising providing a packet transmission abort signal to at least one protocol layer when a packet transmission is aborted.

18. An article comprising a machine-readable storage medium containing instructions that if executed enable a system to monitor channel conditions; receive information associated with said channel; receive a list of pending packets available for transmission, wherein receiving the list of pending packets available for transmission comprises receiving a packet number, packet length, packet timeout, packet priority, and transport protocol for each of the said pending packets; differentiate between reliable and unreliable transport mechanisms: establish a number of retry transmissions for said packets based on said transport mechanism reliability; generate an output signal based on said channel information and said list of pending packets, and provide an early warning signal to at least one protocol layer to indicate channel failure and to switch transmission to a different channel.

19. The article of claim 18, comprising instructions that if executed enable the system to jointly adapt for packet retransmissions and modulation and coding schemes based on said received information associated with said channel and said received list of pending packets available for transmission.

20. The article of claim 18, comprising instructions that if executed enable the system to provide a packet transmission abort signal to at least one protocol layer when a packet transmission is aborted.

* * * * *

UNITED STATES PATENT AND TRADEMARK OFFICE
CERTIFICATE OF CORRECTION

PATENT NO. : 7,573,820 B2 Page 1 of 1
APPLICATION NO. : 11/171589
DATED : August 11, 2009
INVENTOR(S) : Krishnaswamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this

Seventh Day of September, 2010

David J. Kappos
*Director of the United States Patent and Trademark Office*